United States Patent [19]

Yokoi

[11] Patent Number: 4,771,812

[45] Date of Patent: Sep. 20, 1988

[54] CONNECTOR FOR JOINING A WIRE TYPE BODY TO A MACHINE ELEMENT

[76] Inventor: Junichi Yokoi, 11-20 Wakae-Honmachi 2-chome, Higashi-Osaka City, Osaka-fu, Japan

[21] Appl. No.: 46,943

[22] Filed: May 7, 1987

[30] Foreign Application Priority Data

May 7, 1986 [JP] Japan .................. 61-105714

[51] Int. Cl.$^4$ ............................. D03C 13/00
[52] U.S. Cl. ...................... 139/82; 139/87; 139/88; 403/43; 24/115 R
[58] Field of Search ............... 139/82, 87, 88; 24/115 R; 403/41, 43

[56] References Cited

U.S. PATENT DOCUMENTS

| | | | | |
|---|---|---|---|---|
| 3,241,574 | 3/1966 | Kramer | ...... | 139/88 |
| 3,587,660 | 6/1971 | Dion | ...... | 139/88 |
| 4,422,481 | 12/1983 | Palau | ...... | 139/88 |

FOREIGN PATENT DOCUMENTS 2737936  2/1979  Fed. Rep. of Germany ........ 139/88

Primary Examiner—Henry S. Jaudon
Attorney, Agent, or Firm—Wenderoth, Lind & Ponack

[57] ABSTRACT

A connector for joining a wire type body to a machine element which includes a bracket, an insertion member and a connecting bolt. The insertion member is connected to the bracket and couples the bracket to the machine element. The connecting bolt includes a male threaded portion screwed into a female threaded part, one of which is mounted on the bracket and the other of which is connected to the wire type body. The connector is useful in a weaving machine for connecting a setting lever of an actuating device to a wire type body attached to a harness frame. The connector offers the advantages of reduced wear while providing easy replacement of various parts of the connector.

18 Claims, 5 Drawing Sheets

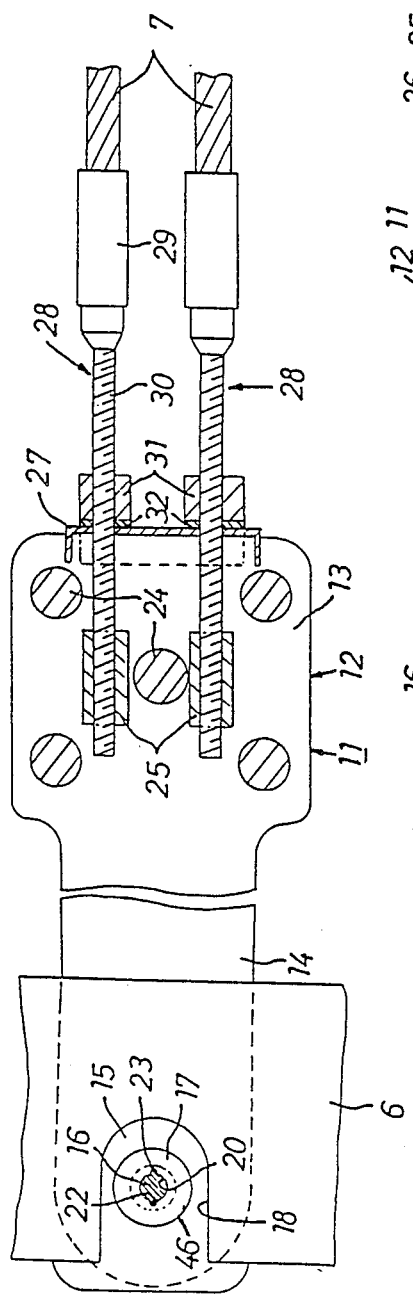
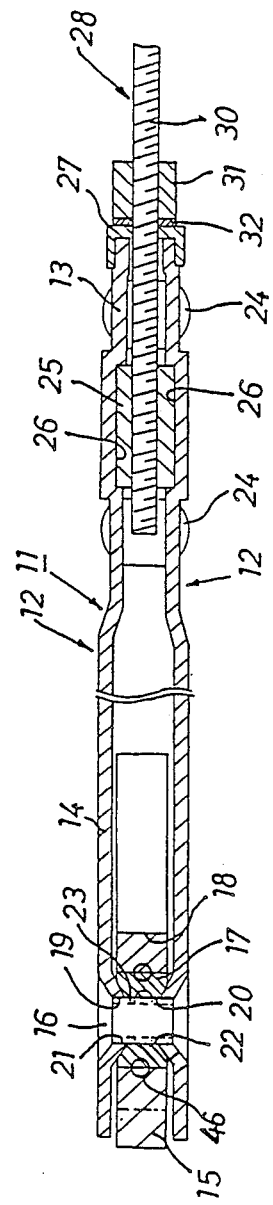
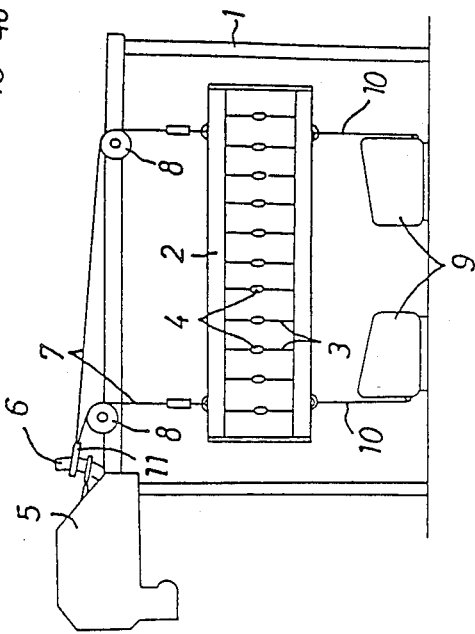
FIG. 1
FIG. 5
FIG. 2

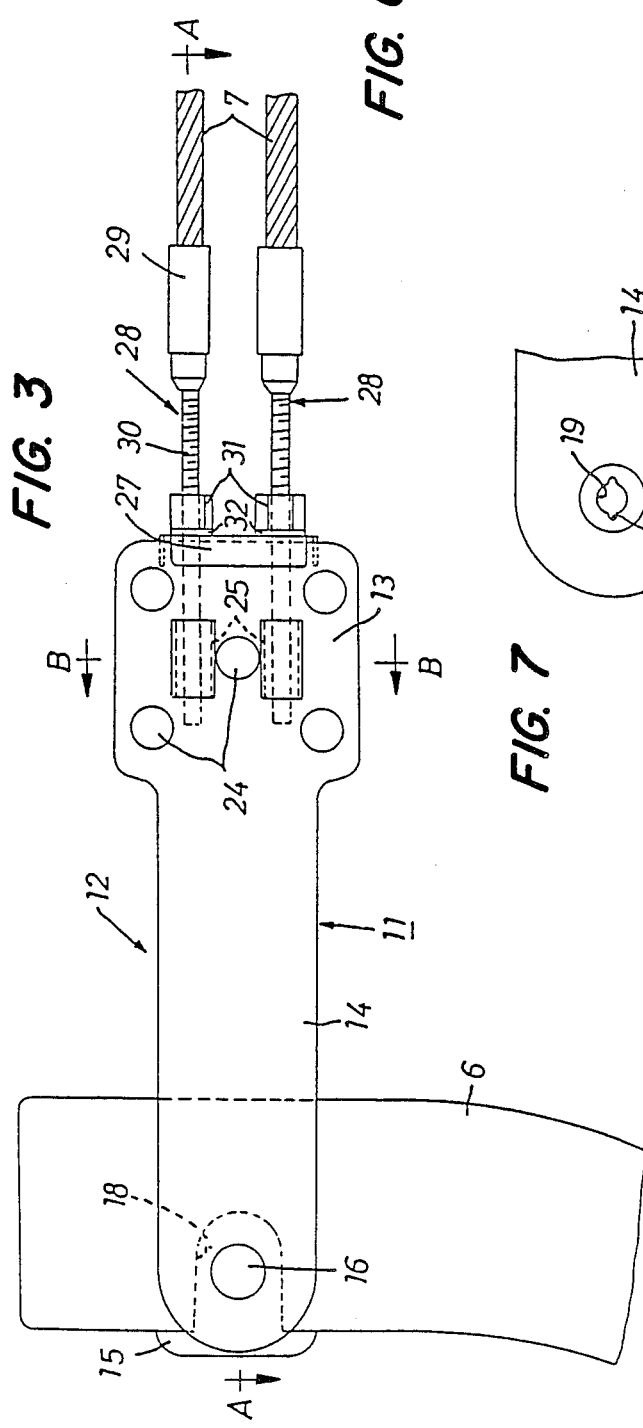
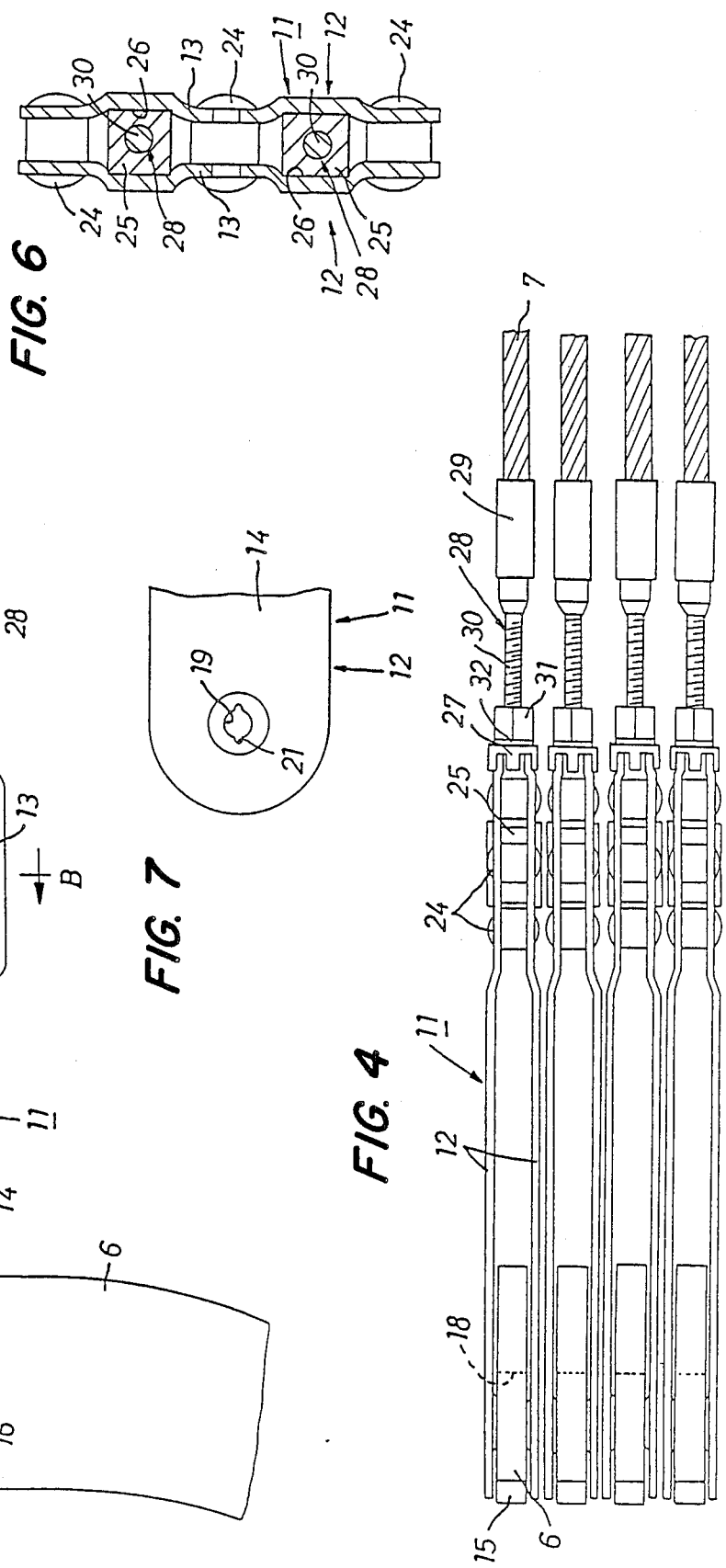

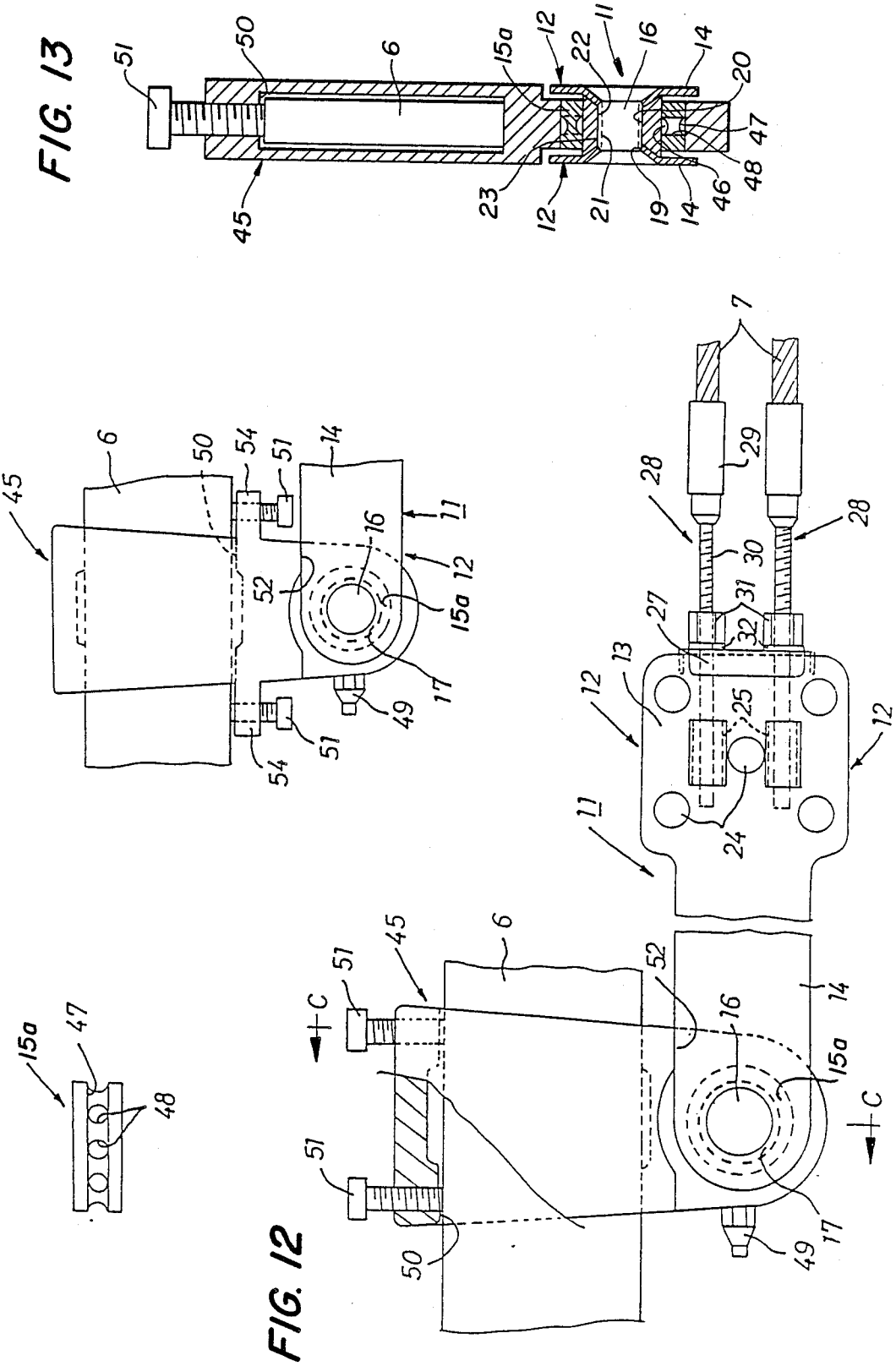

CONNECTOR FOR JOINING A WIRE TYPE BODY TO A MACHINE ELEMENT

BACKGROUND OF THE INVENTION

1. Field of the Invention

The present invention relates to improvements in a connector for joining a wire type body to a machine element, such as is used in a weaving machine or the like.

2. Description of the Prior Art

In the textile industry, there is known a weaving machine and an acessory apparatus therefore known as the Dobby machine, which includes a setting lever which lifts a harness frame by means of wires or cables such that a predetermined warp which passes through the eye or opening of a heddle of the harness frame is lifted to thereby form an opening between the warp thus lifted and another warp through which a weft extends.

As shown in FIGS. 18 and 19, which illustrate the prior art, in order to connect the wires extending from the harness frame to the setting lever of the Dobby machine, an engaging recessed portion 68 of a setting lever 67 is engaged with a mating portion 70 of a bracket 69. An end portion of each wire, such as stranded wire, is inserted into and fixed to a base portion of a connector 72. A connecting pin 73 mounted on an end portion of the connector 72 is received in an engaging notched portion 74 of a pivotal extension of the bracket 69.

In the conventional wire connecting apparatus of the foregoing construction, however, the rotational movement of the setting lever 67 causes the connecting pin 73 to turn within and relative to the engaging notched portion 74 which results in abrasion of the connecting pin 73 which leads to breakage thereof. This is one disadvantage of the conventional wire connecting apparatus used with the setting lever of the Dobby machine.

To overcome this disadvantage of the conventional wire connecting apparatus, a variety of proposals have been made such as, for example, the wires are fixed to the bracket by winding the wires directly into the bracket and securing the wires within the bracket. However, these proposals have not met with success since the wire connecting apparatus becomes complicated in construction and the bracket and wire assembly must be replaced with a new one should the wires become cut or damaged.

SUMMARY OF THE INVENTION

It is an object of the present invention to provide an improved wire connecting apparatus which can be used for joining two elements, in which the foregoing disadvantages and problems of the conventional wire connecting apparatus are overcome.

An object of the present invention is to provide a connector comprising a bracket, an insertion member connected to the bracket, the insertion member adapted for connection to a first member, and at least one bolt means connected to the bracket, the bolt means adapted for connection to a second member, the bolt means including a male threaded portion and a female threaded part, the male threaded portion being screwed into the female threaded part of the bolt means for detachably coupling the first member to the second member, one of the male threaded portion and the female threaded part being connected to the bracket. The bracket includes a pair of spaced-apart side plates with either the male threaded portion or the female threaded part of the bolt means fitted therebetween.

The bracket of the present invention can include a shaft extending between the side plates and the insertion member can be rotatably supported by the shaft. Also, the insertion member can be disposed between the side plates and a bushing can be disposed between the shaft and the insertion member. Preferably, the bushing is fixed to the shaft to prevent rotation of the bushing relative to the shaft. Thus, the shaft can include at least one projection and the bushing can include a groove in which the projection is fitted to prevent rotation of the bushing relative to the shaft. Furthermore, the shaft can be fixed to the side plates to prevent rotation of the shaft relative to the side plates by providing axially aligned grooves in the side plates in which the projection on the shaft is received. The insertion member can be of a synthetic polyamide fiber material and the shaft and bushing can be of metal or ceramic material. The bushing and the insertion member preferably include at least one lubricating passage such as a circumferentially extending groove formed in the mating surfaces of the insertion member and the bushing.

To prevent the female threaded part or male threaded portion of the bolt means from rotating with respect to the bracket, the side plates can include confronting seats which receive the female threaded part or male threaded portion therebetween. Also, the bracket can include a cover plate disposed over free ends of the side plates and if the female threaded part is held between the side plates, the male threaded portion extends through a hole in the cover member and a locking nut is disposed on the male threaded portion with the cover plate disposed between the locking nut and the side plates. Preferably, the side plates are parallel to each other and extend in a longitudinal direction with either the male threaded portion or the female threaded part of the bolt means extending in the longitudinal direction and fitted therebetween. More than one bolt means can be connected to the bracket and with the present invention, two bolt means are preferably provided connected to the bracket.

The bolt means of the present invention can include a cylindrical wire jointing part connected to the second member, and the second member can comprise a wire joined at one end thereof to the wire jointing part of the bolt means. Also, the first member can comprise a shedding lever of an actuating device such as a Dobby machine and the insertion member can be detachably connected to the shedding lever and the wire can be connected to an upper end or a lower end of a harness frame of the weaving machine. Alternatively, the first member can comprise a V-shaped shedding lever detachably connected to the insertion member and a plurality of V-shaped shedding levers can be rotatably mounted on a holding shaft, each of the V-shaped levers including a roller rotatably mounted thereon and adapted to engage a cam surface which effects pivoting of the levers at regular intervals. An attachment member can be provided for detachably connecting the insertion member to the shedding lever and the attachment member can be pivotally connected to the insertion member. Preferably, the attachment member includes an opening therein in which the insertion member is rotatably disposed. Also, the insertion member can be cylindrical in shape and include at least one lubricating passage in fluid communication with mating surfaces of the insertion member and the attachment member for providing a lubricant therebetween. The attachment member can include an insertion opening sized to receive the shedding lever and the attachment member includes means for fixedly securing the shedding lever in the insertion opening. The attachment member can also include an abutment which contacts the bracket when the bracket is rotated to a predetermined angular position with respect to the attachment member.

In one embodiment of the present invention, the first member is detachably connected to the insertion member and the first member includes means thereon for preventing sliding of the insertion member therealong the sliding preventing means comprising a corrugated surface and an adjusting piece can be provided between the insertion member and the corrugated surface of the first member, the adjusting piece having a mating corrugated surface in contact with the corrugated surface of the first member.

In another embodiment of the present invention, the first member comprises a first wire which is detachably connected to the insertion member and the second member comprises a second wire which is connected to the male threaded portion of the bolt means. In this embodiment, the bracket can comprise a pulley having means thereon for guiding the first and second wires around a portion of an outer periphery thereof, the insertion member comprising a bolt base extending from the bracket, the first wire including an adjusting bolt extending through the bolt base, the adjusting bolt being connected to the bolt base by a pair of nuts threaded on the adjusting bolt with the bolt base therebetween. Also, the periphery of the pulley is curved and extends between first and second cut-outs in the outer periphery of the pulley, the bolt base being disposed in the second cut-out, and the female threaded part is disposed in a portion of the pulley facing the curved periphery of the pulley with the first cut-out therebetween.

BRIEF DESCRIPTION OF THE DRAWINGS

The present invention will be described with reference to the accompanying drawings, in which:

FIG. 1 is a cross sectional view of the connector of the present invention according to a first embodiment thereof;

FIG. 2 is a schematic elevational view of the overall arrangement of a weaving machine including the connector according to the first embodiment of the present invention;

FIG. 3 is a side elevational view of the connector according to the first embodiment of the present invention;

FIG. 4 is a top plan view of a plurality of connectors according to the first embodiment of the present invention;

FIG. 5 is a cross sectional view taken along the line A—A of FIG. 3;

FIG. 6 is a cross sectional view taken along the line B—B of FIG. 3:

FIG. 7 is an elevational side view of an end portion of a bracket which forms part of the connector according to the first embodiment of the present invention;

FIG. 12 is an elevational side view of the connector according to the fourth embodiment of the present invention;

FIG. 13 is a cross sectional end view taken along the line C—C of FIG. 12;

FIG. 14 is an elevational view of a modified form of an insertion member forming part of the connector according to the fourth embodiment of the invention;

FIG. 15 is an elevational side view of the connector according to a fifth embodiment of the present invention;

DETAILED DESCRIPTION OF THE PREFERRED EMBODIMENTS

Figure 8:
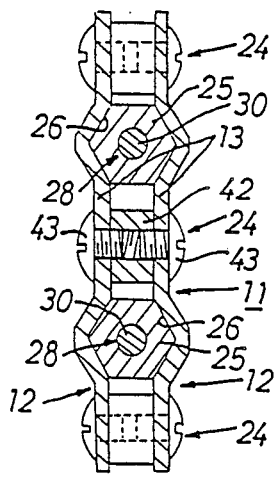
FIG. 8 is a cross sectional end view of the connector according to a second embodiment of the present invention.
Figure 10:
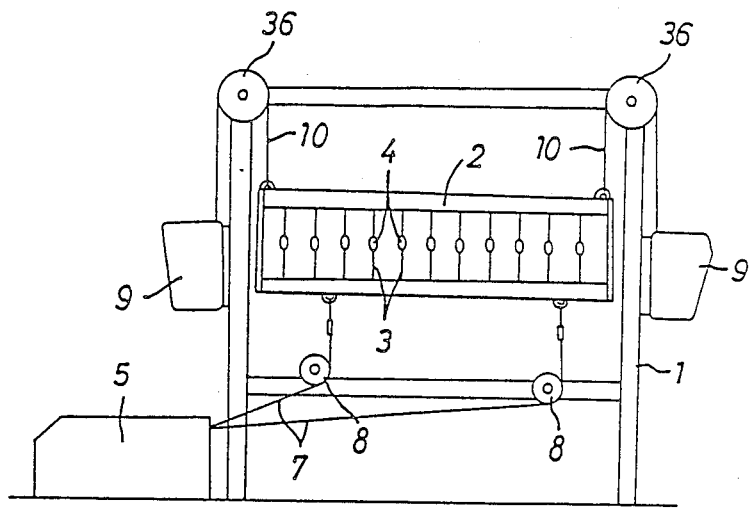
FIG. 10 is a schematic elevational view of an overall arrangement of a weaving machine utilizing the connector of the present invention according to a fourth embodiment thereof.

The first preferred embodiment of the connector according to the present invention will be described with reference to FIGS. 1–7. FIG. 2 shows one harness frame 2 which is vertically movable within a frame 1 of a weaving machine. A plurality of such harness frames 2 extend horizontally within the frame 1 and each harness frame 2 is provided with a large number of heddles 3 which are vertically aligned with each other. Each heddle 3 is provided with a warp passing eye or opening 4 located centrally thereon. An actuating device 5 of the weaving machine can comprise a Dobby machine in this embodiment of the present invention. The Dobby machine 5 is mounted on an upper portion of the frame 1 of the weaving machine. Extending from the actuating device are a large number of shedding levers 6 which pivot about a horizontal axis extending into the plane of FIG. 2. Each shedding lever 6 is connected with the right-hand side and the left-hand side upper edge portion of the harness frame 1 by means of wires 7. Pulleys 8 are supported for rotation on the upper portion of the frame 1 for guiding the wires 7. Located beneath the harness frame 2 on the left-hand side and right-hand side thereof are a pair of pulling means 9 which draw the harness frame 2 downwardly by means of wires 10. The connector of the present invention includes a bracket 11 which can be used to connect a first member comprising a wire 7 to a second member comprising a shedding lever 6.

The bracket 11 is shown in more detail in FIGS. 1 and 3–7. The bracket 11 is preferably made of sheet metal and comprises a pair of spaced-apart side plates 12. Each side plate 12 is provided with a wire connecting portion 13 having a square shape at one end thereof and a supporting portion 14 of elongated rectangular shape at its opposite end. An insertion member 15 having a T-shaped configuration is pivotally supported between the side plates 12 adjacent the free end of the supporting portions 14. A supporting shaft 16 extends between the side plates 12 and a bushing is disposed between the supporting shaft 16 and the insertion member 15. As can be seen in FIGS. 1, 3 and 5, the shedding lever 6 includes an engaging recessed portion or cut-out 18 in which the insertion member 15 is received which allows the shedding lever 6 to be detachably connected to the insertion member 15.

The insertion member 15 can be made from a well known synthetic polyamide fiber such as Nylon or any other similar material and the supporting shaft 16 and the bushing 17 can be formed from a metal, ceramic or like material. The supporting shaft 16 can comprise a rivet or the like, and is caulked to fix the bushing 17 to the side plates 12 of the bracket 11. As shown in FIG. 5, a supporting shaft hole 19 is provided in each side plate 12 and another supporting shaft hole 20 is provided in the bushing 17. In order to prevent rotation of the bushing 17 relative to the supporting shaft 16, the supporting shaft includes at least one projection and preferably two diametrically opposed, axially extending projections 23 which are received in diametrically opposed axially extending grooves 21 in the side plates 12 and diametrically opposed axially extending grooves 22 in the bushing 17. Thus, the grooves 21 and 22 receive the projections 23 on the supporting shaft 16, to prevent rotation of the supporting shaft 16 relative to the side plates 12 or the bushing 17. As a result, wear and abrasion of the supporting shaft 16 due to rotation thereof can be avoided. Also, rotation of the insertion member 15 relative to the supporting portion 14 of the bracket 11 results from the rotation of the Nylon insertion member 15 about the metallic or ceramic bushing 17 which thereby achieves the prevention of extreme wear or abrasion of the contacting surfaces of the shedding lever 6 with the outer surface of the insertion member 15 or the inner surfaces of the supporting portion of the bracket 11. Furthermore, the bushing 17 and/or the insertion member 15 can be provided with at least one lubricating passage. For instance, the inner circumferential surface of the insertion member 15 or the outer circumferential surface of the bushing can be provided with radially extending lubrication holes which are provided at regular intervals or a circumferentially extending lubrication groove 46 can be formed in the mating surfaces of the insertion member 15 and the bushing 17, to thereby achieve a reduction in wear or abrasion between the surfaces of the insertion member 15 and the bushing 17 which are in contact with each other.

The wire connecting portions 13 of the side plates 12 of the bracket 11 can be fixed to each other by suitable means such as the five fixtures 24 shown in FIG. 3. Thus, for instance, a fixture 24 such as a rivet or bolt can be provided adjacent each corner of the wire connecting portions 13 of the side plates 12 and a single fixture 24 can be provided in the center of the wire connecting portions 13. The connector of the present invention includes at least one bolt means 28 connected to the bracket, the bolt means 28 being adapted for connection to a second member, such as the wire 7. The bolt means includes a male threaded portion 30 and a female threaded part 25, the male threaded portion 30 being screwed into the female threaded part 25 for detachably coupling the first member such as the shedding lever 6 to the second member such as the wire 7. Either the male threaded portion 30 or the female threaded part 25 is connected to the bracket 11, and in the first embodiment of the present invention, the female threaded part 25 is connected to the bracket 11. In particular, the female threaded part 25 of the bolt means 28 is fitted between the pair of spaced-apart side plates 12. To accommodate the female threaded part 25 of the bolt means 28, each side plate 12 includes a seat 26 which is shaped such that the female threaded part 25 is prevented from rotation relative to the side plates. Thus, for example, if the female threaded part 25 has a rectangular shape, as shown in FIGS. 1, 3, 5 and 6, the seat 26 is formed by a rectangular depression in the side plate 12.

The bracket 11 also includes a cover plate disposed over free ends of the wire connecting portions 13 of the side plates and the male threaded portion 30 of the bolt means 28 extends through a hole in the cover plate 27 and a locking nut 31 is disposed on the male threaded portion 30 with the cover plate 27 disposed between the locking nut 31 and the side plates 12 for securely fixing the bolt means 28 to the bracket 11. Interposed between the locking nut 31 and the cover plate 27 is a lock washer 32.

The bolt means 28 includes a cylindrical wire jointing part 29 which is attached to the wire 7, as shown in FIGS. 1 and 3-5. Thus, according to the first embodiment, the side plates 12 are parallel to each other and extend in a longitudinal direction with the threaded portion 30 of the bolt means 28 extending in the longitudinal direction and fitted therebetween. Also, a second bolt means 28 is connected to the bracket 11 in the same manner as described above with reference to the first bolt means 28.

In operation, according to the first embodiment of the present invention, each harness frame 2 is drawn downwardly by a spring force of the pulling means 9, and if any desired one of the shedding levers 6 of the actuating device 5 is moved in the left-hand direction of FIG. 2, the harness frame 2 which is attached to the particular shedding lever 6 is lifted by means of the insertion member 15, the bracket 11, the bolt means 28 and the wire 7. As a result, the warps passing through the eyes or openings 4 of the heddles 3 of the harness frame 2 are also lifted, and openings are made between such warps and the other warps, whereby wefts are inserted through the openings thus formed.

A tension adjustment for each wire 7 is easily performed by the simple operation in which the locking nut 31 is loosened and the male threaded portion 30 of the bolt means 28 is screwed further into or out of the female threaded part 25 of the bolt means, to any desired degree, and thereafter the locking nut 31 is tightened.

Also, each wire 7 is readily replaceable with a new wire without requiring replacement of the bracket 11. That is, in order to replace a wire 7, the locking nut 31 is loosened, the male threaded portion 30 of the bolt means 28 is detached from the female threaded part 25, and either a new wire can be secured to the wire jointing part 29 or a wire 7 having a wire jointing part 29 and a male threaded portion 30 already attached thereto can be screwed into the female threaded part 25. Thereafter, the locking nut 31 is tightened to complete the wire replacement operation.

FIG. 8 illustrates a second preferred embodiment of the present invention wherein the seats 26 in the side plates 12 have a different configuration from that of the first embodiment. That is, the female threaded part 25 of the bolt means can have a hexagonal cross section and the seats 26 can have a V-shaped configuration to accommodate the female threaded part 25. Also, the fixtures 24 can comprise a pair of screws 43, each of which extends through a side plate 12 and into an insert 42 disposed between the side plates 12. This construction allows the side plates 12 to be separated for removal or insertion of the female threaded parts 25.

Figure 9:
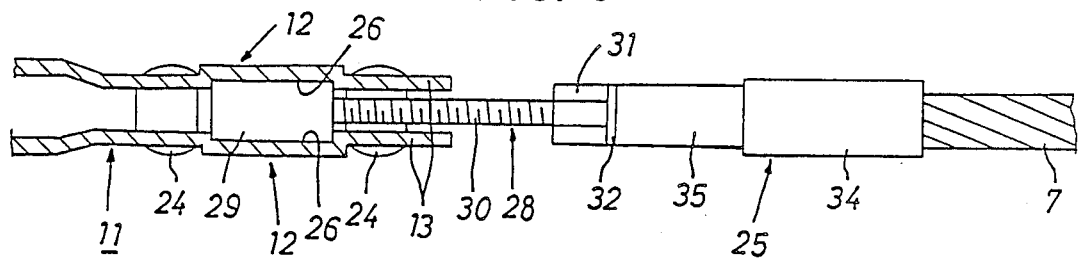
FIG. 9 is a cross sectional top view of the connector according to a third embodiment of the present invention.

FIG. 9 shows a third preferred embodiment of the present invention wherein the wire jointing part 29 of the bolt means 28 is fitted between the side plates 12. In this embodiment, the bolt means 28 includes a wire connecting portion 34 which is adapted for connection to a first member such as a wire 7 and a female threaded part comprising a nut portion 35 attached to the wire connecting portion 34. The male threaded portion 30 of the bolt means 28 is threaded into the nut portion 35 and is locked thereto by means of a lock washer 32 and a locking nut 31 which are tightened against the nut portion 35. In this embodiment, the wire jointing part 29 of the first and second embodiment is not connected to the wire 7 and instead is formed as a solid cylindrical body which is received in the seats 26 of the wire connecting portions 13 of the side plates 12. In the third embodiment, the insertion member 15 is adapted for connection to a first member such as the shedding lever 6 and the bolt means 28 is adapted for connection to a second member such as a wire 7.

The fourth preferred embodiment of the present invention is shown in FIGS. 10–14 wherein the weaving machine is arranged differently from that illustrated in FIG. 2. That is, the actuating device 5 is located on the lower side of the weaving machine frame 1. Thus, in this embodiment the first member comprises a shedding lever 6 of the actuating device 5 and the insertion member is detachably connected to the shedding lever 6 and the second member comprising the wire 7 is connected to a lower end of the harness frame 2 of the weaving machine. The actuating device 5 includes a cam mechanism which is shown in part in FIG. 11. Also, the pulling means 9 are located on opposite sides of the weaving machine frame 1 and are connected with the harness frame 2 by means of pulleys 36 located above the pulling means 9 and connecting wires 10 extending around the pulleys 36 between the harness frame 2 and the pulling means 9. With this arrangement, each harness frame 2 is lowered by means of the cam mechanism of the actuating device 5 and is lifted by using the spring force of the pulling means 9.

Figure 11:
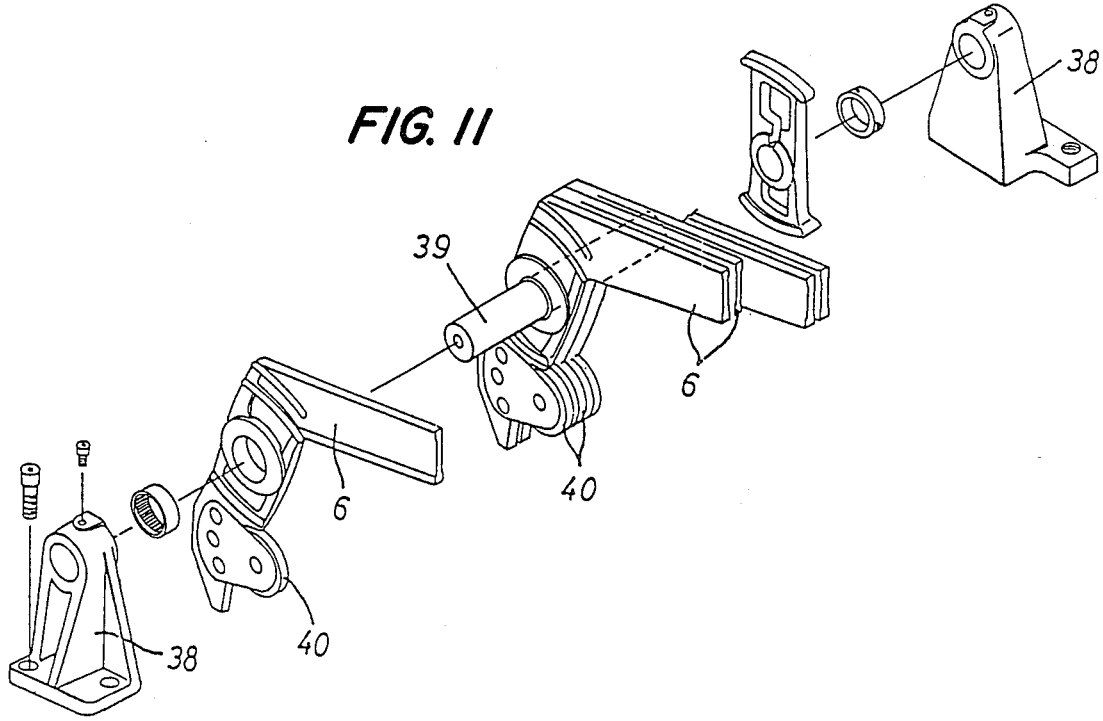
FIG. 11 is an exploded perspective view of the shedding lever and supporting arrangement which form principle components of an actuating device for a harness frame of a weaving machine, according to the embodiment shown in FIG. 10.

As shown in FIG. 11, the first member comprises a V-shaped shedding lever 6 detachably connected to the insertion member (not shown). The V-shaped shedding levers 6 are rotatably mounted in pairs on a holding shaft 39 and each of the V-shaped levers includes a roller 40 rotatably mounted thereon and adapted to engage a cam surface (not shown) which effects pivoting of the levers 6 at regular intervals of time. As a result, the rotating motion of the cam of the actuating device 5 causes the shedding levers 6 to be pivoted at regular intervals of time. The holding shaft 39 extends between a pair of supporting members 38 and is prevented from rotation by a shedding screw provided in each supporting member 38. The plurality of V-shaped shedding levers 6 are in alignment such that every two shedding levers 6 are in proximity with each other.

As shown in FIG. 12, an attachment member 45 is provided for detachably connecting a modified insertion member 15a to the first member comprising one of the shedding levers 6. The attachment member 45 is pivotally connected to the insertion member 15a and is adapted for rigid connection to the shedding lever 6. In this embodiment, the insertion member 15a has a cylindrical shape and is fitted in an opening in the attachment member 45. Both the insertion member 15a and the attachment member 45 are fitted between the supporting portions 14 of the side plates 12. The bracket 11 includes the supporting shaft 16 and the bushing 17 described with respect to the first embodiment of the present invention. The modified insertion member 15a is formed with a lubricating passage, such as a circumferentially extending lubrication groove 47 located centrally in the central portion of the periphery of the insertion member 15a and also the lubricating passage can comprise a plurality of radially extending lubrication holes 48 located at regular spaced intervals around the periphery of the insertion member 15a, as shown in FIG. 14. The lubrication holes 48 extend through the thickness of the insertion member 15a such that the lubricating passage is in fluid communication with the mating surfaces of the insertion member 15a and the bushing 17. Furthermore, a grease nipple 49 is provided on the attachment member 45 for providing lubricant to the mating surfaces of the insertion member 15a and the attachment member 45 and due to the provision of the lubricating holes 48 and lubricating groove 47, lubricant is provided to the mating surfaces of the bushing 17 and the insertion member 15a to thereby reduce wear and abrasion thereof.

The attachment member 45 includes an insertion opening 50 sized to receive the shedding lever 6 and the attachment member 45 includes means 51 for fixedly securing the first member in the insertion opening 50. In this embodiment, the securing means 51 is disposed on an upper end of the attachment member 45 and comprises a pair of spaced-apart bolts 51 which extend inwardly into the insertion opening 50 for clamping the shedding lever 6 against a portion of the attachment member 45 forming the lower surface of the insertion opening 50. Thus, by loosening the bolts 51, the shedding lever 6 can be easily inserted into or removed from the insertion opening 50 in the attachment member 45. Thus, the bracket 11 is pivotally connected to one end of the attachment member 45 and the securing means 51 is disposed at an opposite end of the attachment member 45 with the insertion opening 50 therebetween, as shown in FIG. 12. The attachment member 45 also includes an abutment 52 which contacts the bracket 11 when the bracket 11 is rotated to a predetermined angular position with respect to the attachment member 45. Thus, the abutment 52 can be provided to contact the bracket 11 when the bracket extends perpendicularly from the attachment member 45. As such, if the upper portion of the shedding lever 6 is pivoted downwardly, the attachment member 45 depresses the bracket 11 by means of the abutment 52.

FIG. 15 shows a fifth preferred embodiment of the present invention wherein the securing means 51 is disposed on an intermediate portion of the attachment bracket 45 at a location between the insertion opening 50 and the opening in which the insertion member 15a is rotatably disposed in the attachment bracket 45. To accomplish this purpose, the attachment bracket 45 includes a pair of flanges 45 which extend outwardly away from the remainder of the attachment bracket 45 and parallel to the shedding lever 6 and the bolts 51 extend through the flanges 54 to clamp the shedding lever 6 against a portion of the attachment bracket 45 forming an upper surface of the insertion opening 50.

Figure 16:
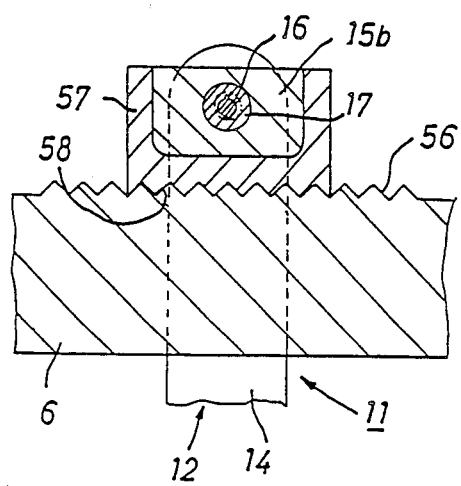
FIG. 16 is a cross sectional view of the connector according to a sixth embodiment of the present invention.

FIG. 16 shows a sixth preferred embodiment of the present invention wherein the first member comprising the shedding lever 6 is detachably connected to a second modified insertion member 15b, the first member comprising the shedding lever 6 including means 56 thereon for preventing sliding of the insertion member therealong. In particular, the shedding lever can include a corrugated upper surface 56 and an adjusting piece 57 can be provided between the insertion member 15b and the corrugated surface 56. The adjusting piece 57 has a mating corrugated surface 58 in contact with the corrugated surface of the first member comprising the shedding lever 6. In this embodiment, the bracket 11 is pivotally connected to the shedding lever 6 by means of the shaft 16, the bushing 17, the insertion member 15b and the adjusting piece 57. Also, the arrangement is such that the bracket 11 extends perpendicularly from the shedding lever 6 and the side plates 12 in the supporting portions 14 of the bracket 11 are disposed on either side of the shedding lever 6 such that the shedding lever 6 can be freely inserted or removed from the space between the side plates 12. In this embodiment, the insertion member 15b is formed in a rectangular configuration and the adjusting piece 57 includes a U-shaped recess therein in which the insertion member 15b can easily be inserted or removed therefrom.

Figure 17:
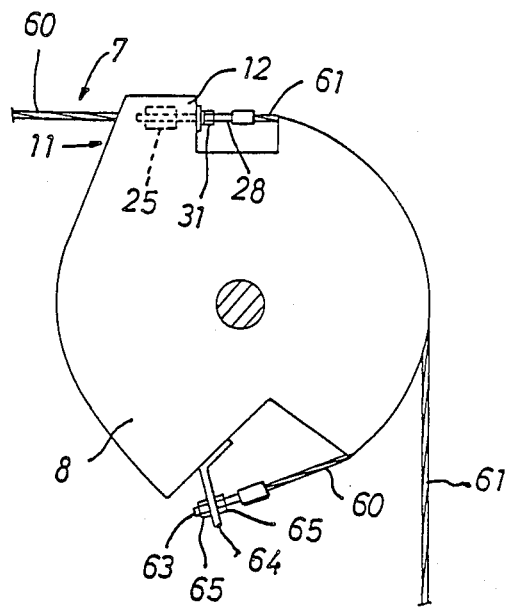
FIG. 17 is an elevational side view of the connector according to a seventh embodiment of the present invention.
Figure 18:
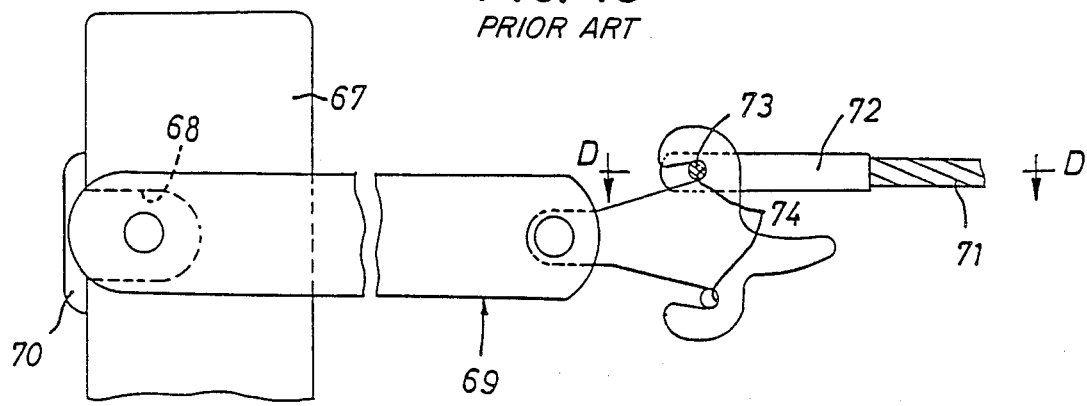
FIG. 18 is an elevational side view of a prior art connector.
Figure 19:
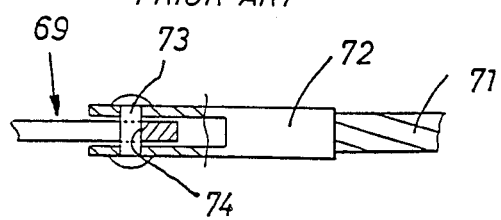
FIG. 19 is a cross sectional view taken along the line D—D of FIG. 18.

FIG. 17 shows a seventh preferred embodiment of the present invention wherein the bracket comprises a pair of spaced-apart side plates 12 with the female threaded part 25 of the bolt means 28 fitted therebetween. The male threaded portion of the bolt means is adapted for connection to a second member and an insertion member is fixedly attached to the bracket and is adapted for connection to a first member. In this embodiment, the first member comprises a first wire 60 which is detachably connected to the insertion member and the second member comprises a second wire 61 which is connected to the male threaded portion of the bolt means 28. Furthermore, the bracket 11 comprises a pulley 8 having means thereon for guiding the first and second wires 60, 61 around a portion of an outer periphery thereof. The insertion member comprises a bolt base 64 extending from the bracket 11, the first wire 60 including an adjusting bolt 63 extending through the bolt base 64 and the adjusting bolt 63 is connected to the bolt base 64 by a pair of nuts 65 threaded on the adjusting bolt 63 with the bolt base 64 therebetween. The portion of the periphery of the pulley around which the wires 60, 61 extend is curved and extends between first and second cut-outs in the outer periphery of the pulley. The bolt base 64 is disposed in the second cut-out and the female threaded part 25 is disposed in a portion of the pulley 8 facing the curved periphery with the first cut-out therebetween. The first wire 60 is adapted for connection to the shedding lever 6 (not shown) and the second wire 61 is adapted to be connected to the harness frame 2 (not shown). Thus, as shown in FIG. 17, the upper portion of the pulley 8 includes a pair of spaced-apart side plates 12 between which the female threaded part 25 of the bolt means 28 is received. Furthermore, the bracket 11 formed by the pulley 8 includes an insertion member comprising the bolt base 64 which is adapted for connection to a first member comprising the first wire 60 and the bolt means includes a male threaded portion screwed into the female threaded part 25 which is connected to the bracket 11 and further, the bolt means 28 is adapted for connection to a second member comprising the second wire 61. Furthermore, a locking nut 31 is provided for securing the male threaded portion of the bolt means 28 to the female threaded part 25 of the bolt means 28.

The foregoing several preferred embodiments of the connector according to the present invention have been described with reference to use of the connector in a weaving machine. However, it will be readily understood by those skilled in the art that the connector of the present invention can be used with many other types of machines or applications in which wires are connected to other parts. Furthermore, the second member could be other than a wire and could instead comprise any element which is detachably connected to another element comprising the first member.

It should be apparent from the foregoing description that the connector of the present invention includes a bolt means comprising a male threaded portion and a female threaded part, one of which is fixed between the side plates of the bracket and the other of which is secured to a wire such as a stranded cable. Furthermore, a machine element is engaged with the insertion member disposed in the end portion of the bracket between the side plates to thereby connect the machine element with the wire. Such an arrangement is an improvement over the conventional connecting apparatus for use in weaving machines. It is particularly noteworthy that the arrangement of the present invention offers improved life of the connector compared to the prior art arrangement due to reduced wear and abrasion between the bracket and the shedding lever caused by the high-speed motion of the shedding lever. Furthermore, the arrangement of the present invention does not suffer from the disadvantages of the pin 73 and grooves 74 arrangement of the prior art since the wire 7 is rigidly secured by means of the bolt means 28 and the bracket 11 whereas in the prior art arrangement the connecting pins 73 were easily broken due to abrasion thereof. The arrangement of the present invention also offers the advantage of simple adjustment in the tension between the wires 7 and the shedding levers 6. Furthermore, should replacement of the wire 7 become necessary, it is not necessary to also replace the bracket 11 with a new one whereas in the prior art arrangement it was necessary to replace both the wire and the bracket 69, at least where the wire was connected directly thereto.

As compared with the conventional connecting apparatus of the same type as the present invention, the connector of the present invention is very simple in construction as shown and described in the foregoing with reference to the several preferred embodiments of the invention. Furthermore, it is to be understood that the present invention is not limited in its application to weaving machines, but rather is widely applicable to many other machines or types of equipment, such as the oil-hydraulic systems of air planes, the braking systems of automobiles, motorcycles and bicycles, and the like, in which wire type bodies are connected with their elements.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein.

I claim:

1. A connector comprising:
   a bracket;
   an insertion member connected to said bracket, said insertion member adapted for connection to a first member; and
   at least one bolt means connected to said bracket, said bolt means connected to a second member comprising a wire body, said bolt means including a male threaded portion and a female threaded part, said male threaded portion being screwed into said female threaded part of the bolt means for detachably coupling the first member to the second member, one of said male threaded portion and said female threaded part being at all times immovably fixed to said bracket by means for preventing rotation therebetween.

2. The connector of claim 1, wherein said bracket comprises a pair of spaced-apart side plates with said female threaded part of said bolt means fitted therebetween by said means for preventing rotation therebetween and said male thread portion of said bolt means being connected to the second member, said side plates being parallel to each other and extending in a longitudinal direction with said threaded portion of said bolt means extending in said longitudinal direction and fitted therebetween.

3. The connector of claim 2, wherein said bracket includes a shaft extending between said side plates and said insertion member is disposed between said side plates and rotatably supported by said shaft.

4. A connector comprising:
   a bracket;
   an insertion member connected to said bracket, said insertion member adapted for connection to a first member; and
   at least one bolt means connected to said bracket, said bolt means adapted for connection to a second member, said bolt means including a male threaded portion and a female threaded part, said male threaded portion being screwed into said female threaded part of the bolt means for detachably coupling the first member to the second member, one of said male threaded portion and said female threaded part being connected to said bracket, said bracket comprising a pair of spaced-apart side plates with said female threaded part of said bolt means fitted therebetween and said male threaded portion of said bolt means being adapted for connection to the second member, said side plates being parallel to each other and extending in a longitudinal direction with said threaded portion of said bolt means extending in said longitudinal direction and fitted therebetween, said bracket including a shaft extending between said side plates and said insertion member being disposed between said side plates and rotatably supported by said shaft, said shaft including at least one projection and said bushing including a groove in which said projection is fitted to prevent rotation of said bushing relative to said shaft.

5. The connector of claim 4, wherein said shaft is fixed to said side plates to prevent rotation of said shaft relative to said side plates, said side plates including axially aligned grooves receiving said projection on said shaft to thereby prevent rotation of said shaft relative to said side plates.

6. The connector of claim 4, wherein mating surfaces of said bushing and said insertion member are in contact with each other and at least one of said bushing and said insertion member include at least one lubricating passage, said lubricating passage being a circumferentially extending groove formed in at least one of said mating surfaces of said insertion member and said bushing.

7. A connector comprising:
   a bracket;
   an insertion member connected to said bracket, said insertion member adapted for connection to a first member; and
   at least one bolt means connected to said bracket, said bolt means adapted for connection to a second member, said bolt means including a male threaded portion and a female threaded part, said male threaded portion being screwed into said female threaded part of the bolt means for detachably coupling the first member to the second member, one of said male threaded portion and said female threaded part being connected to said bracket, said bracket comprising a pair of spaced-apart side plates with said female threaded part of said bolt means fitted therebetween and said male threaded portion of said bolt means being adapted for connection to the second member, said side plates being parallel to each other and extending in a longitudinal direction with said threaded portion of said bolt means extending in said longitudinal direction and fitted therebetween, said side plates including confronting seats receiving said female threaded part therebetween to prevent rotation of said female threaded part relative to said side plates, said bracket further including a cover plate disposed over free ends of said side plates with said male threaded portion extending through a hole in said cover plate and a locking nut is disposed on said male threaded portion with said cover plate disposed between said locking nut and said side plates.

8. The connector of claim 1, wherein said at least one bolt means comprises two bolt means, each of which is connected to a respective said second member comprising a wire body and each of which includes a male threaded portion and a female threaded part, said male threaded portion being screwed into said female threaded part of said bolt means, said bracket being at all times immovably fixed to one of said male threaded portion and said female threaded part of each of said bolt means by said means for preventing rotation therebetween.

9. The connector of claim 1, wherein said bolt means includes a cylindrical wire jointing part connected to said second member, said second member comprising said wire body joined at one end thereof to said wire jointing part of said bolt means, said first member comprising a shedding lever of an actuating device of a weaving machine, said insertion member being detachably connected to said shedding lever and said wire body being connected to an end of a harness frame of said weaving machine.

10. The connector of claim 1, wherein said bracket includes a pair of spaced-apart side plates with said male threaded portion of said bolt means fitted therebetween by said means for preventing rotation therebetween and said female threaded part of said bolt means being adapted for connection to the second member.

11. The connector of claim 1, wherein said first member comprises a V-shaped shedding lever of a Dobby machine detachably connected to said insertion member, a plurality of said V-shaped shedding levers being rotatalby mounted on a holding shaft, each of said V-shaped shedding levers including a roller rotatably mounted thereon and adapted to engage a cam surface which effects pivoting of said shedding levers at regulate intervals of time.

12. The connector of claim 1, wherein the first member is detachably connected to said insertion member, said first member including a cut-out in which said insertion member is received.

13. The connector of claim 1, wherein the first member is detachably connected to said insertion member, said first member including means thereon for preventing sliding of said insertion member therealong, said sliding preventing means comprising a corrugated surface on said first member and an adjusting piece is provided between said insertion member and said corrugated surface of said first member, said adjusting piece having a mating corrugated surface in contact with said corrugated surface of said first member.

14. The connector of claim 1, wherein said means for preventing rotation comprises a first plurality of flat surfaces on said bracket and a second corresponding plurality of flat surfaces on one of said male threaded portion and said female threaded part, said first plurality of flat surfaces being in engagement with said second plurality of flat surfaces.

15. A connector comprising:
a bracket;
an insertion member connected to said bracket, said insertion member adapted for connection to a first member; and
at least one bolt means connected to said bracket, said bolt means adapted for connection to a second member, said bolt means including a male threaded portion and a female threaded part, said male threaded portion being screwed into said female threaded part of the bolt means for detachably coupling the first member to the second member, one of said male threaded portion and said female threaded part being connected to said bracket, said bracket comprising a pair of spaced-apart side plates with said female threaded part of said bolt means fitted therebetween and said male threaded portion of said bolt means being adapted for connection to the second member, said side plates being parallel to each other and extending in a longitudinal direction with said threaded portion of said bolt means extending in said longitudinal direction and fitted therebetween, said bracket including a shaft extending between said side plates and said insertion member being disposed between said side plates and rotatably supported by said shaft, an attachment member being provided for detachably connecting said insertion member to the first member, said attachment member being pivotally connected to said insertion member and adapted for rigid connection to the first member, said insertion member being disposed between said side plates, said attachment member including an opening therein in which said insertion member is rotatably disposed, said insertion member being cylindrical in shape and including at least one lubricating passage in fluid communication with mating surfaces of said insertion member and said attachment member for providing a lubricant therebetween, said attachment member including an insertion opening sized to receive the first member, and said attachment including means for fixedly securing the first member in said insertion opening.

16. The connector of claim 15, wherein said bracket is pivotally connected to one end of said attachment member and said securing means is disposed at an opposite end of said attachment member with said insertion opening therebetween.

17. The connector of claim 15, wherein said securing means is disposed on an intermediate portion of said attachment member between said insertion opening and said opening in which said insertion member is rotatably disposed.

18. The connector of claim 15, wherein said attachment member includes an abutment which contacts said bracket when said bracket is rotated to a predetermined angular position with respect to said attachment member.

* * * * *